United States Patent [19]

Nelson

[11] 4,046,532
[45] Sept. 6, 1977

[54] REFRIGERATION LOAD SHEDDING CONTROL DEVICE

[75] Inventor: Lorne W. Nelson, Bloomington, Minn.

[73] Assignee: Honeywell Inc., Minneapolis, Minn.

[21] Appl. No.: 705,214

[22] Filed: July 14, 1976

[51] Int. Cl.² .............................................. F25B 1/00
[52] U.S. Cl. ...................................... 62/215; 62/202; 307/117
[58] Field of Search .............. 236/68 B; 62/202, 157, 62/215; 307/140, 117

[56] References Cited

U.S. PATENT DOCUMENTS

| | | | |
|---|---|---|---|
| 3,261,992 | 7/1966 | Coe | 307/117 |
| 3,284,002 | 11/1966 | Edelman et al. | 236/68 B |
| 3,623,545 | 11/1971 | Pinckaers | 236/68 B |
| 3,925,680 | 12/1975 | Dixon | 307/140 |

Primary Examiner—William E. Wayner
Assistant Examiner—Robert Charvat
Attorney, Agent, or Firm—Clyde C. Blinn; Henry L. Hanson

[57] ABSTRACT

A load shedding control device, for reducing the electrical energy demand of an electrical load apparatus having a load dependent upon ambient temperature, having an ambient temperature responsive switch adapted to be connected in a control system of the electrical load apparatus for reducing the use of electrical energy by the electrical load apparatus as the ambient temperature increases. The ambient temperature responsive switch has its control temperature reset depending upon the percent of operating time of the electrical load apparatus whereby as the desired operating time of the load apparatus increases, the actual operating time is reduced to conserve electrical energy.

6 Claims, 3 Drawing Figures

REFRIGERATION LOAD SHEDDING CONTROL DEVICE

BACKGROUND AND SUMMARY OF THE INVENTION

Electric utility companies need to provide and maintain generating facilities and distribution networks which are ample by a safe margin to meet the demand for electric power during periods of peak or maximum demand. Such requirements are needed to maintain their competitive position as suppliers of energy as well as meeting certain governmental regulations. The level of electrical power consumed during other than these peak periods is considerably less than the peak demand; however, to meet the peak demand a considerable investment in generating facilities and distribution networks is needed and yet during a good portion of the time such generating facilities may be idle. To eliminate the investment of several hundred thousand dollars for extra capacity to meet these peak demands, various systems have been used in the past to reduce the demand for electrical energy during the peak periods.

For example, in the control of electric water heaters, timing mechanisms, and even elaborate signaling systems for controlling electric water heaters over the power line by superimposed control signals, have been devised for disconnecting electrical loads during a peak period to reduce the peak demand. Another type of system, such as that shown in the Robert L. Coe U.S. Pat. No. 3,261,992, patented July 19, 1966, is used for selectively disconnecting an electrical refrigeration apparatus when the outdoor temperature exceeds some predetermined value to decrease the peak electrical demand.

The present invention is a device for use with an electrical load apparatus wherein the electrical load increases as some condition such as outdoor temperature increases. As the condition or outdoor temperature increases to result in a greater percent of operation of a refrigeration apparatus, the device is reset or modified so that as the outdoor temperature increases the actual percent "on time" of the refrigeration apparatus is reduced from a normal or desired mode of operation. Specifically, a temperature responsive switch device responds to ambient or outdoor temperature. The switch device is placed in the control circuit of the refrigeration apparatus to stop the operation of the refrigeration apparatus when the temperature of a sensing device exceeds some predetermined temperature value. The control temperature of the temperature responsive switch device is changed by heat from the refrigeration condenser depending upon the amount of operation of the refrigeration apparatus. The refrigeration apparatus is operated in a shorter "on" cycle manner as the outdoor temperature increases thus reducing use of electrical energy.

The invention is described in the drawing of which

Figure 1:
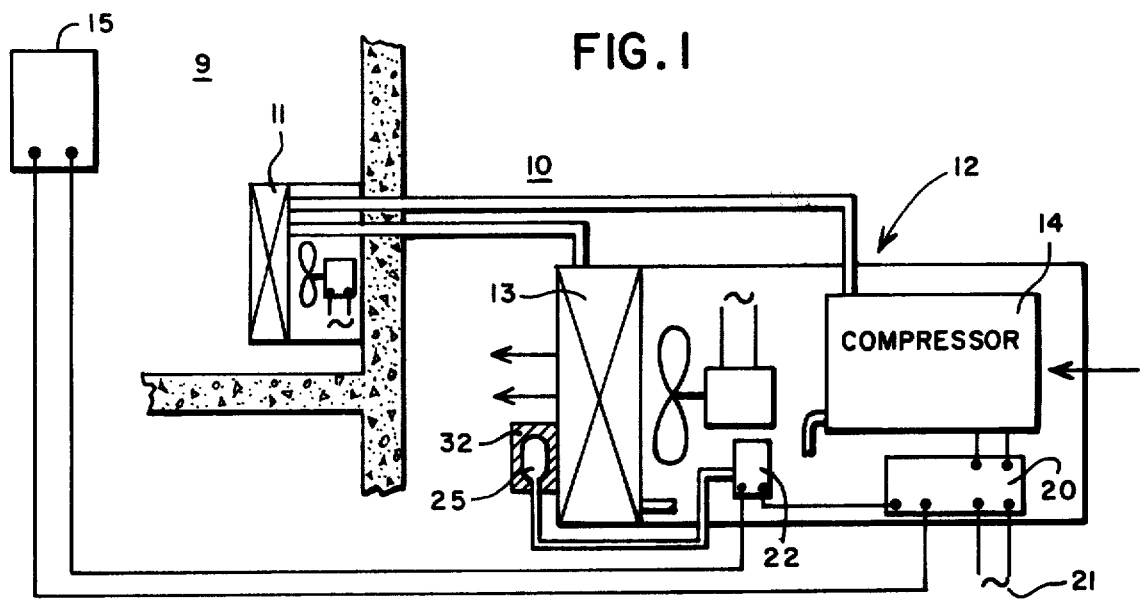
FIG. 1 is a schematic showing of a typical electrical load apparatus such as a refrigeration apparatus for a domestic dwelling.

Referring to FIG. 1, a dwelling or space 9 is being conditioned or cooled by an electrical load apparatus or a conventional refrigeration system 10. An evaporator 11 is connected to a refrigeration apparatus 12 comprising a condenser 13 and a motor driven compressor 14. The refrigeration system is controlled to maintain the condition or temperature of the air in space 9 at some predetermined value as controlled by a room thermostat 15. Thermostat 15 is connected in an electrical control circuit comprising a control device 20 for controlling the supply of electrical energy to compressor 14 from a source 21. A temperature responsive switch means 22 is connected in the control circuit.

Figure 2:
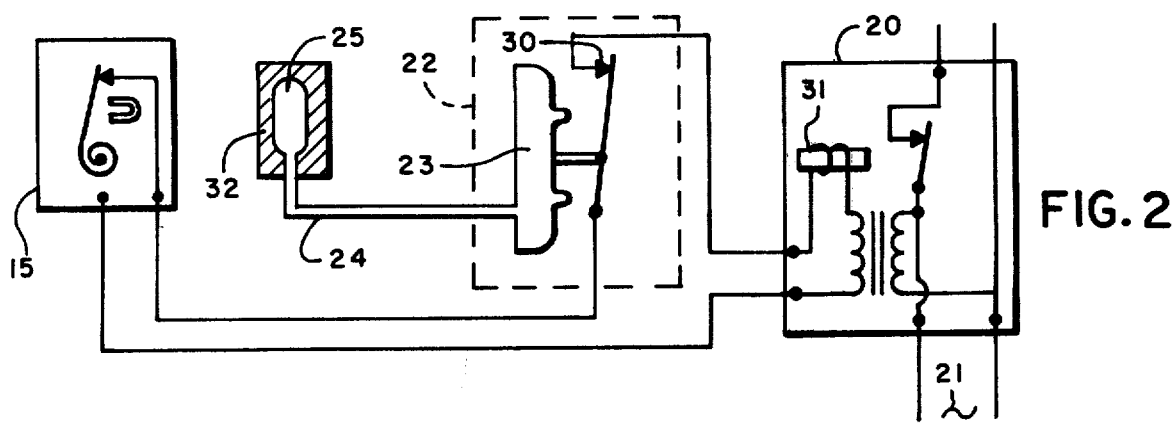
FIG. 2 is a specific showing of the electrical control circuit.

Specifically, the electrical control circuit is shown in FIG. 2. Switch 22 has a liquid filled diaphragm actuator 23 connected by a capillary 24 to a remote bulb or ambient temperature responsive element or temperature responsive portion 25 whereby upon the temperature of bulb 25 exceeding some predetermined temperature, a switch 30 opens to break the control circuit between the thermostat and a relay or contactor 31 in device 20. Bulb 25 is adapted to be placed in the airstream of the exhaust air of the condenser. Bulb 25 is covered by a layer of material 32 such as insulation or metal to reduce its rate of response to a change in air temperature.

Figure 3:
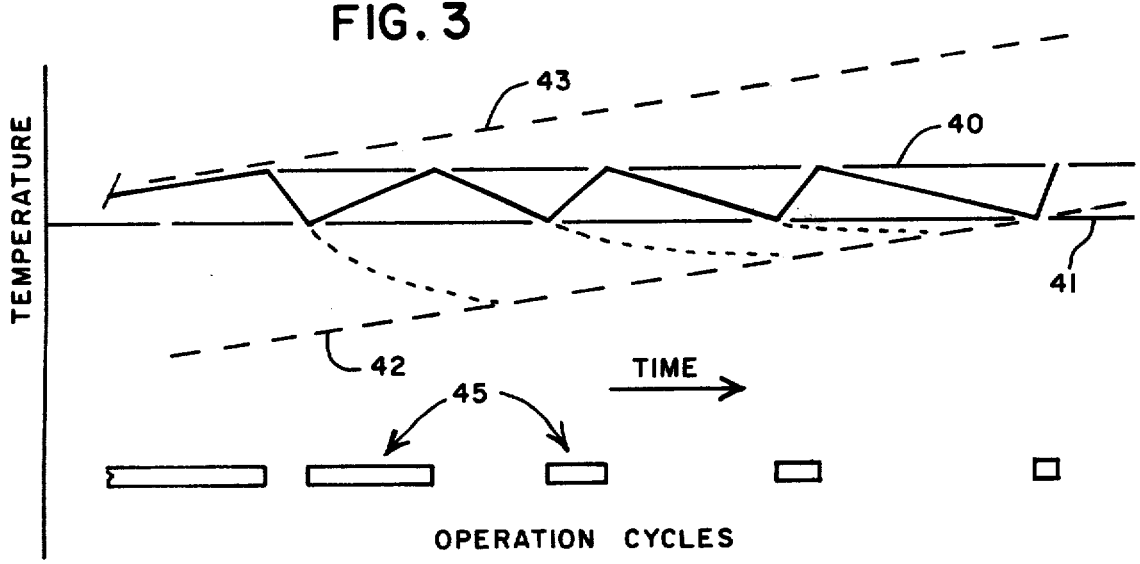
FIG. 3 is a graphical representation of the operation of the control device as applied in the load shedding system.

During the normal operation of the refrigeration apparatus, upon a call for cooling by thermostat 15, the control circuit is closed to energize relay 31 and connect compressor 14 to source 21. As the compressor is energized and the hot air from the condenser passes over bulb 25, a means to reset or modify the control temperature of switch 22 is provided. At some predetermined temperature switch 30 opens to de-energize the compressor for a time depending upon how long it takes for bulb 25 to cool back to a cut-in temperature of switch 22. Referring to FIG. 3, the cut-out temperature and cut-in temperature of switch 22 are shown by the horizontal lines 40 and 41. The temperature of bulb 25 depends upon the outdoor temperature and other conditions which affect the cooling load. Such is shown as line 42 and the added heat of the condenser which determines the temperature of the discharge air from the condenser is as shown in line 43. As the discharge air warms the bulb 25 to a temperature above the cut-off temperature, the refrigeration apparatus is de-energized. The temperature of the bulb then decreases to the cut-in temperature and the refrigeration apparatus is again energized after a short cooling period.

As the outdoor temperature increases, which is the primary load on the temperature conditioning apparatus, and the discharge air temperature from the condenser increases, the time needed for heating bulb 25 above the cut-out temperature is decreased to bring about shorter cycles or periods of operation, shown at 45 of the refrigeration apparatus and thus cut down the demand for electrical energy. The percentage of operating time decreases as the outdoor temperature and air conditioning load increases. As the outdoor temperature increases, the actual operation of the electrical load apparatus is reduced below that of a normal mode of operation by the shorter "on" operation periods, shown by shorter segments 45.

The present control device can be installed on a refrigeration compressor by the original equipment manufacturer and installed in a manner to operate and reset the control point of the device as the refrigeration apparatus operates. By such a load shedding control device, a refrigeration apparatus or electrical apparatus used for a dwelling has a reduced percent of operation as the outdoor temperature increases from the desired or normal type of operation resulting in a shedding of electrical load and the conservation of electrical energy.

The embodiments of the invention in which an exclusive property or right is claimed are defined as follows:

1. A control device for selectively disconnecting an electrical temperature conditioning apparatus from a source of electrical energy to reduce the use of energy by the apparatus as the temperature conditioning load of a building increases, comprising temperature responsive means adapted to be responsive to outdoor temperature, the magnitude of which primarily determines the electrical load of the temperature conditioning apparatus as upon a change in the level of said outdoor temperature the use of electrical energy from the source by the temperature conditioning apparatus increases, control means connected to said temperature responsive means, said control means being adapted to terminate the operation of the electrical temperature conditioning apparatus when the temperature of said temperature responsive means exceeds a predetermined value, and means adapted to reset said temperature responsive means to terminate the operation of the electrical temperature conditioning apparatus at a different value of the outdoor temperature depending upon the operation of the electrical temperature conditioning apparatus whereby as the temperature conditioning apparatus operates a larger percentage of operating time due to an increase in the temperature conditioning load, said means to reset changes the relation of said temperature responsive means on said control means to reduce said percentage of operating time as the temperature conditioning load increases.

2. The invention of claim 1 wherein, the electrical load apparatus is a refrigeration compressor for cooling the air in the building, said temperature responsive means is covered with material to reduce its response to changes in the temperature, said control means is a relay means adapted to connect the refrigeration apparatus to the source of electrical energy, said means to reset is a means adapted to heat said temperature responsive means proportionally to the operation of the refrigeration compressor to provide for shorter operation "on" time as the outdoor temperature increases.

3. The invention of claim 2 wherein said temperature responsive means is adapted to be mounted in a condenser airstream and said means to proportionally heat said temperature responsive means above the outdoor air temperature is the heat of the condenser air when the refrigeration apparatus operates.

4. A control device adapted for use with an electrical load apparatus to reduce the use of electrical energy from a source as the demand for electrical energy by the apparatus increases, comprising, outdoor temperature responsive switch means having a predetermined temperature at which a switch is opened, said switch means is adapted to be connected in a control circuit of the electrical load apparatus to override a normal control of the apparatus, said outdoor temperature responsive switch means being adapted to be associated with the electrical load apparatus for changing the temperature at which said switch is opened whereby as the electrical load apparatus operates a greater percentage of the total time said outdoor temperature responsive switch opens at a different predetermined temperature and thus reduces the use of electrical energy proportional to the change in outdoor temperature.

5. The invention of claim 4 wherein the electrical load apparatus is a refrigeration compressor having a condenser conected thereto in a refrigeration system, and said outdoor temperature responsive switch means is adapted to be mounted in the exhaust airstream of the condenser to affect the operation temperature of said switch means.

6. A control device adapted for use with an electrical energized motor driven compressor of a refrigeration system in which the load of the refrigeration system is changed with changes in outdoor temperature, the device reducing the operation of said motor driven compressor at higher outdoor temperatures to conserve energy, comprising, outdoor temperature responsive switch means adapted to be connected in the electrical control circuit of the motor driven compressor, said temperature responsive switch means having a temperature responsive portion responding to temperature for opening said switch means and the energization circuit of the motor when an outdoor air temperature exceeds a predetermined value, said temperature responsive portion being adapted to be mounted in the exhaust air of a condenser of the refrigeration system to be heated to modify said switch operation and thus proportionally reduce the operation of said motor compressor as the load increases.

* * * * *